United States Patent [19]

Pavel et al.

[11] Patent Number: 4,961,311
[45] Date of Patent: Oct. 9, 1990

[54] DEAERATOR HEAT EXCHANGER FOR COMBINED CYCLE POWER PLANT

[75] Inventors: James Pavel, Lake Mary; Bennie L. Richardson, Winter Park, both of Fla.

[73] Assignee: Westinghouse Electric Corp., Pittsburgh, Pa.

[21] Appl. No.: 414,850

[22] Filed: Sep. 29, 1989

[51] Int. Cl.$^5$ .............................................. F02C 6/00
[52] U.S. Cl. .................................. 60/39.182; 60/646; 60/657
[58] Field of Search ...................... 60/39.182, 646, 657

[56] References Cited

U.S. PATENT DOCUMENTS

| | | | |
|---|---|---|---|
| 3,803,846 | 4/1974 | Letvin | 60/685 |
| 4,391,101 | 7/1983 | Labbe et al. | 60/646 |
| 4,555,906 | 12/1985 | Martens et al. | 60/660 |
| 4,819,436 | 4/1989 | Ahner et al. | 60/657 |

OTHER PUBLICATIONS

Reprint of "New W-501D combined cycle optimized for 307,000 kW and 7000 Btu heat rate", *Gas Turbine World*, vol. 18, No. 5, Oct. 1988.

Presentation to the 19th Meeting of the EEI Combustion Turbine Operations Task Force entitled "The Westinghouse Model 501F Combustion Turbine & Combined Cycle Power Plants" (4/25/89).

*Primary Examiner*—Allen M. Ostrager

[57] ABSTRACT

A combined cycle power plant having a steam turbine, a gas turbine, a heat recovery steam generator, a deaerator and a condenser includes a heat exchanger for controllably exchanging heat between relatively cool condensate from the condenser and relatively warm feedwater from the deaerator in order to recover additional heat from the heat recovery steam generator and, thereby, improve overall efficiency of the combined cycle power plant.

18 Claims, 1 Drawing Sheet

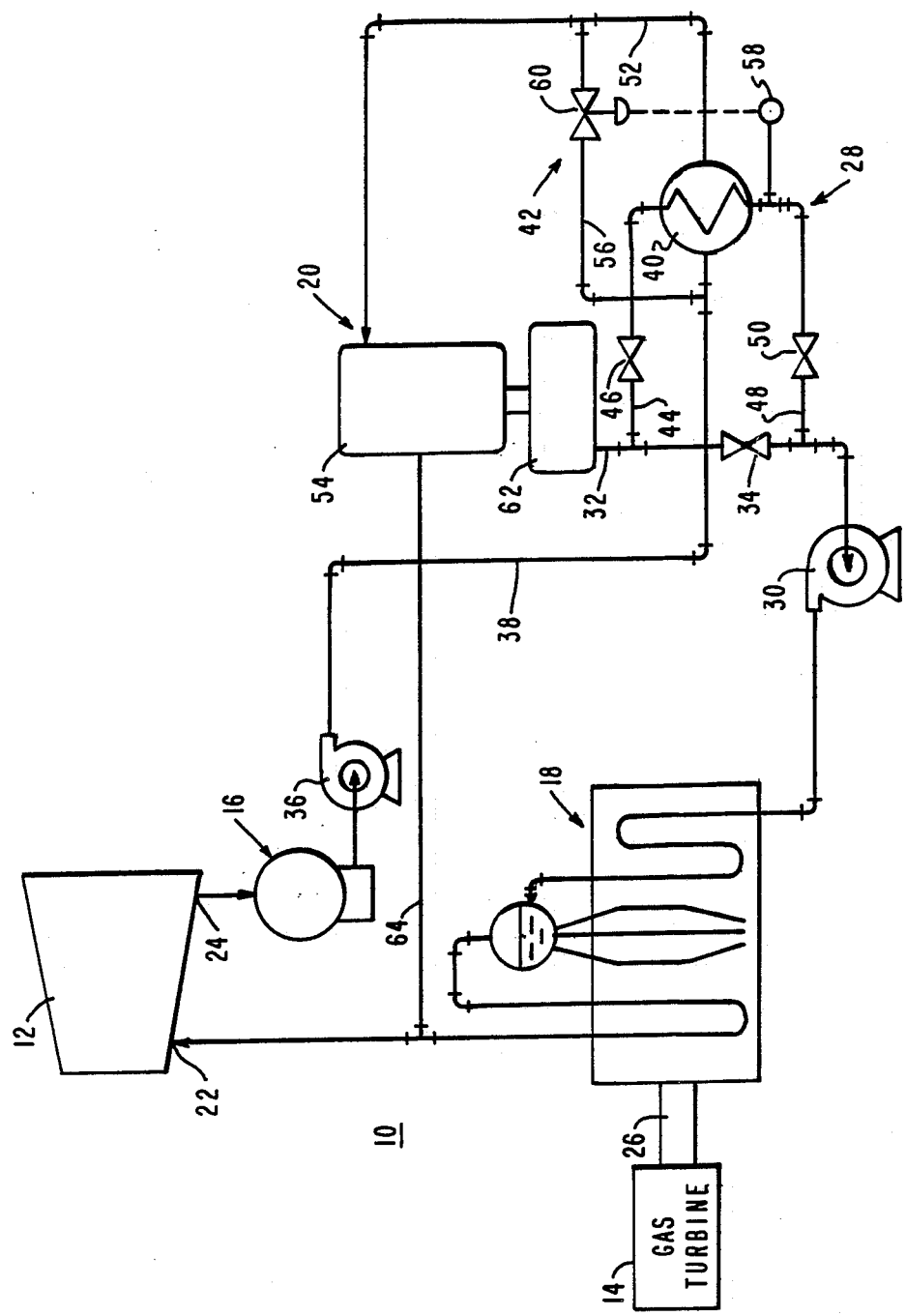

DEAERATOR HEAT EXCHANGER FOR COMBINED CYCLE POWER PLANT

BACKGROUND OF THE INVENTION

1. Field of the Invention

The present invention relates generally to deaerators used in combined cycle power plants, and more particularly to methods and apparatus improving the efficiency of those combined cycle power plants by providing means for heating condensate supplied to such deaerators with feedwater that is deaerated thereby.

2. Statement of the Prior Art

It is well known within the field of power generation to provide one or more combustion turbines in a plant with one or more steam turbines, wherein the waste heat that is exhausted by the combustion turbine(s) is used to generate motive steam for the steam turbine(s) and all turbines are coupled to generators to produce electrical power. Plants such as these are typically referred to as "combined cycle power plants".

As with conventional combined cycle power plants, the steam turbines used therein include an inlet portion which receives the motive steam generated by the waste heat from the combustion turbines, as well as an exhaust portion for exhausting the spent motive steam from the steam turbines. A condenser that is connected to the exhaust portion of the steam turbine receives the spent motive steam and condenses same to provide a supply of condensate.

The combustion turbines (which are also referred to as "gas" turbines) each include an exhaust portion to exhaust the waste heat that they produce in the form of gases to a heat recovery steam generator or "HRSG". Such HRSG's are connected between the exhaust portion of the gas turbine(s) and the inlet portion of the steam turbine(s) for receiving the waste heat that is exhausted by the gas turbine(s), for generating the motive steam from a supply of feedwater that is heated by such waste heat, and for supplying the motive steam to the steam turbine(s). A conventional deaerator is connected to the condenser to receive therefrom the supply of condensate and for deaerating such condensate to provide the supply of feedwater to the HRSG.

In typical combined cycle power plants, the supply of feedwater for the HRSG's is provided by boiler feed pumps which receive relatively warm (e.g., from about 220°-250° F.), deaerated water from the deaerator. Additional heat could be recovered from the exhaust gases in the HRSG by the mere provision of a supply of feedwater that is relatively cool, for example, by providing the condensate directly from the condenser to the HRSG. The additional heat which would be recovered in this manner would increase overall efficiency of the combined cycle power plant, but would concomitantly necessitate the usage of expensive, corrosion-resistant materials for all of the heat transfer surfaces in the HRSG since such HRSG would be required to operate with feedwater which is not deaerated.

SUMMARY OF THE INVENTION

Accordingly, it is a general object of the present invention to provide a combined cycle power plant having greater overall efficiencies of operation than those which have been realized heretofore. More specifically, it is an object of the present invention to provide a combined cycle power plant and methods of operating same for recovering an additional amount of heat from the exhaust gases of the gas turbines which are used therein.

Another object of the present invention is to provide heat exchange means for a combined cycle power plant which is configured to receive the condensate from the condenser of the combined cycle power plant, for selectively heating such condensate and at the same time cooling the feedwater provided to the HRSG from the deaerator.

Still another object of the present invention is to provide methods of operating deaerator heat exchange means to avoid problems of corrosion in the HRSG.

Briefly, these and other objects according to the present invention are accomplished in a combined cycle power plant generally comprising a steam turbine, a gas turbine, an HRSG, a deaerator and a condenser by a heat exchanger which controllably exchanges the heat between relatively cool condensate and relatively warm feedwater within the combined cycle power plant.

The steam turbine conventionally includes an inlet portion for receiving motive steam and an exhaust portion for exhausting its spent motive steam to a condenser. In such a manner, the condenser is connected to the exhaust portion of the steam turbine for receiving the spent motive steam therefrom, and for condensing the spent motive steam to a supply of condensate. The gas turbine also includes an exhaust portion for exhausting its waste heat (in the form of exhaust gases) to the HRSG connected between the exhaust portion of the gas turbine and the inlet portion of the steam turbine. As a result, the HRSG is adapted to receive the waste heat exhausted by the gas turbine, and to generate the motive steam for the steam turbine from a supply of feedwater which is heated by such waste heat.

Because the deaerator is connected to the condenser for receiving the supply of condensate, and for deaerating that condensate to provide the supply of feedwater to the HRSG, the heat exchanger according to the present invention is suitably connected between the supply of condensate and the deaerator, as well as between &:he deaerator and the HRSG, for exchanging heat from the supply of feedwater from the deaerator to heat the supply of condensate prior to its receipt by the deaerator. In accordance with one important aspect of this invention, such exchange of heat between the feedwater and the condensate permits additional recovery of heat in the HRSG by further reducing the temperature of the stack gases leaving the HRSG.

In accordance with another important aspect of the present invention, the deaerator heat exchanger is adapted to provide condensate to the deaerator at a temperature of substantially the same as the normal operating temperature of the deaerator. Such warming of the condensate greatly reduces the steam demand of the deaerator, thereby allowing that steam which would have been otherwise provided to the deaerator to be made available for expansion in the steam turbine.

Because the deaerator heat exchanger according to the present invention is installed in feedwater piping leaving the deaerator at a point upstream of the boiler feed pumps, the heat exchanged therein provides a secondary advantage of sub-cooling the feedwater. This location also helps to satisfy suction pressure (i.e., net positive suction head) requirements of the boiler feed pumps.

In accordance with yet another important aspect of this invention, the deaerator heat exchanger includes a means of bypassing same. While the condensate heating, feedwater cooling, and satisfaction of suction pressure characteristics provided by the deaerator heat exchanger are especially desirable when used in operations of the combined cycle power plant with low-sulfur content fuels (e.g., natural gas), a means of bypassing the deaerator heat exchanger becomes particularly important when sulfur-bearing fuels are used in the combined cycle power plant. Accordingly, this deaerator heat exchanger is adapted to optimize combined cycle power plants under most operating conditions.

Other objects, advantages, and novel features in accordance with the present invention will become more apparent from the following detailed description thereof, when it is considered in conjunction with the accompanying drawings wherein:

BRIEF DESCRIPTION OF THE DRAWINGS

The sole figure illustrates, in schematic form, a combined cycle power plant which includes a deaerator heat exchanger in accordance with the present invention.

DETAILED DESCRIPTION OF THE INVENTION

Referring now to the drawings, wherein like numbers designate like or corresponding parts throughout, there is shown generally in the sole figure a combined cycle power plant 10.

As is conventional, the combined cycle power plant 10 generally comprises at least one steam turbine 12, at least one gas turbine 14, a condenser 16, a heat recovery steam generator (HRSG) 18, and a deaerator 20. Other variations of known combined cycle power plants may include more than one steam turbine, more than one gas turbine, and/or more than one HRSG, although such variations have little or no effect on the present invention.

In any case, however, the steam turbine 12 includes an inlet portion 22 for receiving motive steam and an exhaust portion 24 for exhausting the motive steam that is spent by the steam turbine. The condenser 16 is connected to the exhaust portion 24 of the steam turbine 12 for receiving the spent motive steam and for condensing that spent motive steam to a supply of condensate. The gas turbine 14 also includes an exhaust portion 26 for exhausting waste heat (produced by the gas turbine 14 as exhaust gases), and the HRSG 18 is connected between the exhaust portion 26 of the gas turbine 14 and the steam turbine 12. Accordingly, the HRSG 18 receives the waste heat that is exhausted by the gas turbine 14, generates the motive steam from a supply of feedwater heated by the waste heat, and supplies the motive steam to the steam turbine 12. The deaerator 20 is connected to the condenser 16 for receiving its supply of condensate and for deaerating that condensate to provide the supply of feedwater to the HRSG 18.

In order to provide a combined cycle power plant 10 which has greater overall efficiencies of operation than those which have been realized heretofore, heat exchanger means 28 are connected between the supply of condensate in the condenser 16 and the deaerator 20, as well as between the deaerator 20 and the HRSG 18, for exchanging heat from the supply of feedwater from the deaerator 20 to heat the supply of condensate prior to its receipt by the deaerator 20.

A boiler feed pump 30 is connected by boiler feed pump piping 32 which couples the deaerator 20 to the HRSG 18, in order to provide a flow of feedwater through the HRSG 18, with first valve means 34 being provided in the boiler feed pump piping 32 for isolating the supply of feedwater from the deaerator 20 to the boiler feed pump 30. A condensate pump 36 is also connected by condensate piping 38 between the supply of condensate within the condenser 16 and the heat exchanger means 28 to provide a flow of the condensate through the heat exchanger means 28.

In accordance with one important aspect of the present invention, the heat exchanger means 28 may comprise shell-and-tube, plate, or other known types of heat exchanger 40 as may be preferred which includes means for bypassing 42 same. The heat exchanger bypassing means 42 generally comprises first bypass piping 44 which is connected between the heat exchanger 40 and the boiler feed pump piping 32 at an upstream side of the first valve means 34, second valve means 46 in the first bypass piping 44 for isolating the supply of feedwater to the heat exchanger 40, second bypass piping 48 which is connected between the heat exchanger 40 and the boiler feed pump piping 32 at a downstream side of the first valve means 34, and third valve means 50 in the second bypass piping 48 for isolating the supply of feedwater from the heat exchanger 40 to the HRSG 18. The first, second and third valve means 34, 46, 50 may each comprise any suitable valve (e.g., a ball valve or a plug valve) which is capable of stopping flow of the fluid within their respective piping.

The heat exchanger means 28 according to the present invention also includes heated condensate piping 52 which connects the heat exchanger 40 to a vapor portion 54 of the deaerator 20. Third bypass piping 56 is also connected to the condensate piping 38 on an upstream side of the heat exchanger 40, and to the heated condensate piping 52 on a downstream side of the heat exchanger 40, in addition to means 58 for sensing feedwater temperatures in the heat exchanger 40. Fourth valve means 60 is installed within the third bypass piping 56 for substantially, reducing the flow of the condensate through the heat exchanger 40 in response to a predetermined minimum feedwater temperature in the heat exchanger 40 which is sensed by the feedwater temperature sensing means 58.

Deaerated feedwater which is stored in a low pressure storage tank portion 62 of the deaerator 20 typically has a temperature of about 230° F., while the temperature of the condensate pumped from the condenser 16 by the condensate pump 36 is typically about 100° F. By selectively opening and closing the first, second, and third valve means 34, 46, 50, however, the temperature of the condensate which enters the vapor portion 54 of the deaerator 20 can easily be heated by the relatively hotter (e.g., 230° F.) feedwater that is contained in the storage tank portion 62 of the deaerator 20.

In accordance with another important aspect of the present invention, the relatively colder condensate which enters the heat exchanger 40 can easily be used to cool the feedwater which is pumped through the HRSG 18 by the boiler feed pump 30. This enables the cooler feedwater within the HRSG 18 to further cool stack temperatures within the HRSG 18, thereby recovering an additional amount of heat which can be used to generate power in the steam turbine 12. As the feedwater to the HRSG 18 has been deaerated before its cooling, it does not contain corrosion-causing elements. Any requirement for use of corrosion-resistant materials is, thus, substantially eliminated.

In order to enable a cooling of the feedwater from the storage tank portion 62 of the deaerator 20 as is discussed above, the first valve means 34 is closed while the second and third valve means 46, 50 are opened. The valves thusly positioned permit the 230° F. feedwater from the storage tank portion 62 of the deaerator 20 to be cooled by the cooler, 100° F. condensate from the condenser 16 in the heat exchanger 40. Assuming that the fourth valve means 60 is in a fully-closed position, the heated condensate discharged from the heat exchanger 40 would preferably have a temperature close to the operating temperature of the vapor portion 54 of the deaerator 20. Even more preferably, the temperature of the heated condensate with such valve positionings would come within about 10° F. of the operating temperature of the vapor portion 54 of the deaerator 20. Such a temperature range is readily achievable with any properly designed heat exchanger 40, although fine control of the feedwater temperatures within such range is enabled through use of the fourth valve means 60. That is, the feedwater temperature sensing means 58 in the heat exchanger 40 can be used according this invention for "fine-tuning" the temperature of the feedwater through adjustments of the position of the fourth valve means 60 to permit more or less flow of the cooler condensate through the heat exchanger 40.

The deaerator heat exchanger 40 as thus far described is primarily applicable to combined cycle power plants which use low-sulfur content fuels. In such applications, the lower stack temperatures within the HRSG 18 provided by cooling of the feedwater can be achieved without corrosion of low temperature surfaces within the HRSG 18 due to the absence of corrosion-causing sulfuric acid in the exhaust gases. On the other hand, the deaerator heat exchanger 40 in accordance with the present invention is also applicable to combined cycle power plants 10 which use sulfur-bearing fuels. Under such circumstances, the heat exchanger 40 is bypassed by opening the first valve means 34 and by closing the second and third valve means 46, 50. The temperature of the feedwater would, thus, be elevated to approximately the operating temperature of the deaerator 20. This would, in turn, maintain stack temperatures within the HRSG 18 above the acid-dewpoint and would, thereby eliminate the potential for corrosion even under high-sulfur conditions.

By heating the condensate with feedwater before that condensate enters the deaerator 20, preferably within a range of about 10° F. of the normal operating temperature of the deaerator 20, the demand for steam by the deaerator 20 via steam line 64 is greatly reduced. This, in turn, makes more steam available for expansion within the steam turbine 12 and increases the overall efficiency of the combined cycle power plant 10. Moreover, by cooling the feedwater before it enters the HRSG 18, corrosion within the HRSG 18 can be avoided, and at the same time such "sub-cooling" can help satisfy the suction pressure requirements (i.e., net positive suction head) of the boiler feed pump 30.

Obviously, many modifications and variations of the present invention are possible in light of the foregoing teachings. It is to be understood, therefore, that within the scope of the appended claims the present invention may be practiced otherwise than as is specifically described herein.

What we claim is:

1. A combined cycle power plant, comprising:
   a steam turbine including an inlet portion for receiving motive steam and an exhaust portion for exhausting said motive steam that is spent by said steam turbine;
   a condenser connected to said exhaust portion of said steam turbine for receiving said spent motive steam and for condensing said spent motive steam to a supply of condensate;
   a gas turbine including an exhaust portion for exhausting waste heat that is produced by said gas turbine in the form of exhaust gases;
   a heat recovery steam generator connected between said exhaust portion of said gas turbine and said steam turbine, for receiving said waste heat exhausted by said gas turbine, for generating said motive steam from a supply of feedwater heated by said waste heat, and for supplying said motive steam to said steam turbine;
   a deaerator connected to said condenser for receiving said supply of condensate and for deaerating said condensate to provide said supply of feedwater to said heat recovery steam generator; and
   a heat exchanger connected between said supply of condensate and said deaerator, as well as between said deaerator and said heat recovery steam generator, for exchanging heat from said supply of feedwater from said deaerator to heat said supply of condensate prior to its receipt by said deaerator.

2. The combined cycle power plant according to claim 1, further comprising:
   a feed pump connected by boiler feed pump piping between said deaerator and said heat recovery steam generator to, provide a flow of said feedwater through said heat recovery steam generator; and
   first valve means in said boiler feed pump piping for isolating said supply of feedwater to said feed pump.

3. The combined cycle power plant according to claim 2, further comprising a condensate pump connected by condensate piping between said supply of condensate and said heat exchanger to provide a flow of said condensate through said heat exchanger.

4. The combined cycle power plant according to claim 3, further comprising means for bypassing said heat exchanger.

5. The combined cycle power plant according to claim 4, wherein said heat exchanger bypassing means comprises:
   first bypass piping connected between said heat exchanger and said boiler feed pump piping at an upstream side of said first valve means;
   second valve means in said first bypass piping for isolating said supply of feedwater to said heat exchanger;
   second bypass piping connected between said heat exchanger and said boiler feed pump piping at a downstream side of said first valve means; and
   third valve means in said second bypass piping for isolating said supply of feedwater from said heat exchanger to said heat recovery steam generator.

6. The combined cycle power plant according to claim 5, further comprising:
   heated condensate piping connecting said heat exchanger to said deaerator;
   third bypass piping connected to said condensate piping on an upstream side of said heat exchanger, and to said heated condensate piping on a downstream side of said heat exchanger;
means for sensing feedwater temperatures in said heat exchanger; and
fourth valve means in said third bypass piping for substantially reducing said flow of said condensate through said heat exchanger in response to a predetermined minimum feedwater temperature in said heat exchanger having been sensed by said feedwater temperature sensing means.

7. In a combined cycle power plant having a steam turbine, condenser means including a condensate feed pump, a heat recovery generator, a deaerator, and a boiler feed pump, wherein the deaerator is adapted to receive a flow of condensate from the condenser means, through the condensate feed pump, in order to deaerate the condensate, and thereby to provide a supply of feedwater, through the boiler feed pump, for the heat recovery steam generator to generate steam therefrom, the improvement comprising in combination therewith:
means for exchanging heat of the feedwater from the deaerator with the condensate from the condenser means, whereby a demand for steam by the deaerator is reduced and an overall efficiency of the combined cycle power plant is increased.

8. The improvement according to claim 7, further comprising means for selectively bypassing said heat exchanging means.

9. A method of operating a combined cycle power plant which includes a gas turbine, a heat recovery steam generator, a steam turbine, a condenser, a deaerator, and a boiler feed pump, comprising the steps of:
operating said gas turbine to produce waste heat in the form of exhaust gases;
exhausting said waste heat to said heat recovery steam generator to produce motive steam for said steam turbine;
operating said steam turbine with said motive steam, said steam turbine exhaust spent motive steam;
receiving said spent motive steam in said condenser, and condensing same to provide a source of condensate;
receiving said condensate from said condenser in said deaerator and operating same to provide a source of deaerated condensate that is suitable for feedwater;
pumping said feedwater from said deaerator through said heat recovery steam generator for production of said motive steam therein; and
exchanging heat be&:ween said condensate at a point upstream of said deaerator, and said feedwater downstream of said deaerator.

10. The method according to claim 9, wherein said heat exchanging step comprises the steps of:
heating said condensate to a temperature which is substantially the same as an operating temperature of said deaerator; and
cooling said feedwater.

11. The method according to claim 10, wherein said step of cooling said feedwater comprises the step of cooling said feedwater an amount sufficient to prevent the temperature of said exhaust gases in said heat recovery steam generator from exceeding an acid-dewpoint therein.

12. The method according to claim 10, wherein said step of cooling said feedwater comprises the step of sub-cooling said feedwater an amount sufficient to provide a net positive suction head for said boiler feed pump.

13. The method according to claim 9, wherein said gas turbine is operated with a sulfur-bearing fuel, said method further comprising the steps of:
providing means for bypassing said heat exchanging means; and
operating said bypassing means to bypass said heat exchanging means when said gas turbine is operated with said sulfur-bearing fuels.

14. A method of operating a combined cycle power plant of the type having a steam turbine which exhausts spent steam, a condenser coupled to said steam turbine producing condensate from the spent steam, a deaerator coupled to receive the condensate, deaerate same, and thereby producing feedwater, a boiler feed pump pumping the feedwater through a heat recovery steam generator which produces the steam for the steam turbine heated by exhaust gases from a gas turbine, comprising in combination therewith:
providing a heat exchanger between the condenser and the deaerator to receive and discharge the condensate, to receive and discharge the feedwater, and to exchange heat therebetween;
whereby the feedwater which is discharged from said heat exchanger is cooled, and the condensate is heated to a temperature of approximately the same as the operating deaerator.

15. The method according to claim 14, wherein said cooling of the feedwater comprises the step of cooling the feedwater to a temperature which is adapted to recover additional heat from the heat recovery steam generator.

16. The method according to claim 14, wherein said cooling of the feedwater comprises the step of cooling the feedwater to a temperature which is adapted to provide a net positive suction head to the boiler feed pump.

17. The method according to claim 14, wherein said cooling of the feedwater comprises the step of cooling the feedwater to a temperature which is adapted to cool the exhaust gases sufficiently to avoid corrosion.

18. The method according to claim 17, wherein said cooling of the feedwater comprises the step of cooling the feedwater to a temperature which is adapted to cooling the exhaust gases below a sulfuric-acid dewpoint.

* * * * *